United States Patent
Li

(10) Patent No.: US 11,867,513 B2
(45) Date of Patent: Jan. 9, 2024

(54) METHOD, APPARATUS, DEVICE AND STORAGE MEDIUM FOR DETERMINING LANE WHERE VEHICLE LOCATED

(71) Applicant: BEIJING BAIDU NETCOM SCIENCE AND TECHNOLOGY CO., LTD., Beijing (CN)

(72) Inventor: Yinghui Li, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 426 days.

(21) Appl. No.: 17/117,543

(22) Filed: Dec. 10, 2020

(65) Prior Publication Data

US 2021/0334552 A1 Oct. 28, 2021

(30) Foreign Application Priority Data

Apr. 23, 2020 (CN) .......................... 202010327968.0

(51) Int. Cl.
*G01C 21/30* (2006.01)
*G06T 7/80* (2017.01)
(Continued)

(52) U.S. Cl.
CPC ......... *G01C 21/30* (2013.01); *G06F 18/2321* (2023.01); *G06T 7/77* (2017.01);
(Continued)

(58) Field of Classification Search
CPC ............... G01C 21/3822; G01C 21/32; G01C 21/3602; G01C 21/30; G06T 7/80;
(Continued)

(56) References Cited

U.S. PATENT DOCUMENTS 5,790,403 A * 8/1998 Nakayama ............. G06V 20/58
701/28
5,999,877 A * 12/1999 Takahashi ............. G06V 20/54
340/916
(Continued)

FOREIGN PATENT DOCUMENTS

CN 110556012 A 12/2019
EP 3 534 114 A1 9/2019
(Continued)

OTHER PUBLICATIONS

European Patent Application 20213101.7 Partial European Search Report and Opinion dated Jun. 14, 2021, 13 pages.
(Continued)

*Primary Examiner* — Philip P. Dang
(74) *Attorney, Agent, or Firm* — Cozen O'Connor

(57) ABSTRACT

Embodiments of the present disclosure provide a method, apparatus, device, and storage medium for determining a lane where a vehicle is located. In the method, the image lane information of the position where the vehicle is located is determined from a lane line image; actual lane information of a position where the vehicle is located is acquired from existing lane information according to the positioning information of the vehicle; and an actual lane where the vehicle is located is determined based on the image lane information and the actual lane information.

17 Claims, 4 Drawing Sheets

(51) Int. Cl.
*G06T 7/77* (2017.01)
*G06V 20/56* (2022.01)
*G06F 18/2321* (2023.01)

(52) U.S. Cl.
CPC .............. *G06T 7/80* (2017.01); *G06V 20/588* (2022.01); *G06T 2207/30256* (2013.01)

(58) Field of Classification Search
CPC ............ G06T 2207/30256; G06T 7/77; G06V 20/588; G06F 18/2321
See application file for complete search history.

(56) References Cited

U.S. PATENT DOCUMENTS

| | | | | |
|---|---|---|---|---|
| 7,295,925 B2* | 11/2007 | Breed | ..................... | G01S 17/86 340/436 |
| 7,532,981 B2* | 5/2009 | Kataoka | ............... | G06V 20/588 701/300 |
| 8,144,926 B2* | 3/2012 | Mori | ..................... | G06V 20/588 701/523 |
| 8,164,543 B2* | 4/2012 | Seder | ..................... | G02B 27/01 340/461 |
| 8,209,123 B2* | 6/2012 | Miyazaki | ............. | G06V 20/588 701/410 |
| 8,265,869 B2* | 9/2012 | Katou | ................ | G01C 21/3658 701/431 |
| 8,325,800 B2* | 12/2012 | Holcomb | ............. | H04N 19/147 375/240.03 |
| 8,384,532 B2* | 2/2013 | Szczerba | ............... | G01S 13/867 345/7 |
| 8,704,653 B2* | 4/2014 | Seder | ................... | G01S 13/867 340/436 |
| 8,982,188 B2* | 3/2015 | Ota | ....................... | B60W 30/12 348/148 |
| 9,494,438 B1 | 11/2016 | Ichinokawa | | |
| 9,643,600 B2* | 5/2017 | Takahashi | ............. | B60W 30/02 |
| 9,796,422 B2* | 10/2017 | Takahashi | ............. | B60W 30/02 |
| 9,969,384 B2* | 5/2018 | Takahashi | ........... | B60W 40/103 |
| 10,248,124 B2* | 4/2019 | Bellaiche | ............. | G05D 1/0253 |
| 10,293,690 B2* | 5/2019 | Ejiri | .................. | B62D 15/0295 |
| 10,384,679 B2* | 8/2019 | Fujita | ................ | G01C 21/3667 |
| 10,493,987 B2* | 12/2019 | Ohsugi | ........... | B60W 30/18163 |
| 10,558,222 B2* | 2/2020 | Fridman | ........... | B60W 60/0016 |
| 10,562,532 B2* | 2/2020 | Hashimoto | ..... | B60W 30/18163 |
| 10,984,551 B2* | 4/2021 | Shikimachi | .......... | G06V 20/588 |
| 11,021,149 B2* | 6/2021 | Kumano | ............. | B60W 50/045 |
| 11,094,198 B2* | 8/2021 | Fu | ...................... | G01C 21/3819 |
| 11,193,782 B2* | 12/2021 | Daikoku | .............. | G06V 20/588 |
| 11,398,051 B2* | 7/2022 | Lee | ......................... | G06T 5/002 |
| 2005/0171688 A1 | 8/2005 | Fujita et al. | | |
| 2006/0233424 A1* | 10/2006 | Miyajima | ................ | G06T 7/73 382/104 |
| 2009/0222202 A1* | 9/2009 | Kato | .................. | G01C 21/3655 701/414 |
| 2016/0216521 A1* | 7/2016 | Yachida | .................... | B60R 1/00 |
| 2017/0010108 A1* | 1/2017 | Shashua | ............... | G05D 1/0212 |
| 2018/0181817 A1 | 6/2018 | Yan et al. | | |
| 2018/0267172 A1 | 9/2018 | Oh et al. | | |
| 2019/0111930 A1* | 4/2019 | Katsura | ................. | G06V 20/58 |
| 2019/0271550 A1 | 9/2019 | Breed et al. | | |
| 2019/0347820 A1* | 11/2019 | Golinsky | ............... | G08G 1/167 |
| 2019/0383630 A1* | 12/2019 | Lee | ......................... | G01C 21/36 |
| 2020/0133274 A1* | 4/2020 | Kim | ..................... | G05D 1/0088 |
| 2020/0247431 A1* | 8/2020 | Ferencz | ............... | G05D 1/0212 |
| 2020/0307576 A1* | 10/2020 | Takegawa | .............. | B60K 35/00 |
| 2021/0009135 A1* | 1/2021 | Taniguchi | ................ | G08G 1/16 |
| 2021/0207977 A1* | 7/2021 | Lee | ......................... | G06V 20/588 |
| 2021/0270634 A1* | 9/2021 | Fujita | .................... | G06V 20/582 |
| 2021/0309231 A1* | 10/2021 | Fujita | ................. | G01C 21/3602 |
| 2021/0327276 A1* | 10/2021 | Asai | .................. | B60W 60/0015 |

FOREIGN PATENT DOCUMENTS

| | | |
|---|---|---|
| JP | 2005-214883 A | 8/2005 |
| JP | 2007-004669 A | 1/2007 |
| KR | 20190029192 A | 3/2019 |

OTHER PUBLICATIONS

European Patent Application 20213101.7 extended European Search Report and Opinion dated Dec. 3, 2021, 13 pages.

* cited by examiner

METHOD, APPARATUS, DEVICE AND STORAGE MEDIUM FOR DETERMINING LANE WHERE VEHICLE LOCATED

CROSS-REFERENCE TO RELATED APPLICATIONS

This application claims priority to Chinese Patent Application No. 202010327968.0, titled "METHOD, APPARATUS, DEVICE AND STORAGE MEDIUM FOR DETERMINING LANE WHERE VEHICLE LOCATED," filed on Apr. 23, 2020, the content of which is incorporated herein by reference in its entirety.

TECHNICAL FIELD

The present disclosure relates to the field of image processing technology, and more particularly, to an automatic driving technology. Specifically, embodiments of the present disclosure provide a method, apparatus, device, and storage medium for determining a lane where a vehicle is located.

BACKGROUND

In order to improve the accuracy of navigation, it is generally necessary to determine the lane where the vehicle is located, and provide technical support for lane-level navigation according to the lane where the vehicle is located.

An existing method for determining the lane where a vehicle is located mainly includes the following two types:

1) the lane where the vehicle is located is determined in combination with high-precision positioning and high-precision maps.

2) a sensor module is laid in the road to sense the lane where the vehicle is located.

SUMMARY

Embodiments of the present application provide a method, apparatus, device, and storage medium for determining a lane where a vehicle is located to reduce the cost of determining the lane where the vehicle is located.

An embodiment of the present disclosure provides a method for determining a lane where a vehicle is located, the method including:

determining image lane information of a position of the vehicle based on a lane line image;

acquiring actual lane information of the position where the vehicle is located from existing lane information according to the positioning information of the vehicle; and determining an actual lane where the vehicle is located based on the image lane information and the actual lane information.

The embodiments of the present disclosure determine the actual lane where the vehicle is located based on the image lane information and the actual lane information. Since the image lane information can be determined from the lane line image, and the actual lane information can be acquired from the existing lane information, the embodiment of the present disclosure does not require the laying of the sensor and the determination of the high-precision map in the unapplied range.

Further, the determining image lane information of a position where the vehicle is located based on a lane line image includes:

recognizing the lane line image; and determining the image lane information based on the lane line information obtained through recognition.

Based on the technical feature, the embodiment of the present disclosure determines the image lane information according to the lane line information obtained through recognition. Since lane line information has an inherent association with lane information, compared with detecting the lane information directly from the lane line image, the embodiment of the present disclosure can realize further mining of the lane information through the lane line information.

Further, the determining the image lane information based on the lane line information obtained through recognition includes:

determining, based on the obtained lane line information, a lane type of an image lane formed by lane lines; and using the determined lane type as the image lane information.

Based on this technical feature, the embodiment of the present disclosure determines a lane type and uses the determined lane type as image lane information. With the lane type, the lane can be more accurately recognized than other information of the lane, and the amount of occupied data is small.

Further, the determining, based on the obtained lane line information, a lane type of an image lane formed by lane lines includes:

determining at least one of a traveling direction, a traveling vehicle type, and a traveling position of the image lane based on the lane line information; and determining a lane type of the image lane based on at least one of a traveling direction, a traveling vehicle type, and a traveling position of the image lane.

Based on this technical feature, the embodiment of the present disclosure determines an actual lane where the vehicle is located by at least one of a traveling direction of an image lane, a traveling vehicle type, and a traveling position.

Further, the acquiring actual lane information of the position where the vehicle is located from existing lane information according to positioning information of the vehicle includes:

determining a road position where the vehicle is located according to a positioning longitude and latitude in the positioning information;

determining a traveling direction of the vehicle according to a heading angle in the positioning information; and acquiring actual lane information of the position where the vehicle is located from existing lane information according to the road position where the vehicle is located and the traveling direction of the vehicle.

Based on this technical feature, the embodiment of the present disclosure obtains actual lane information of the position where the vehicle is located from the existing lane information according to the road position where the vehicle is located and the traveling direction of the vehicle.

Further, the determining an actual lane where the vehicle is located based on the image lane information and the actual lane information includes:

matching the image lane information with the actual lane information;

establishing an association relationship between an image lane associated with the lane line image and an actual lane associated with the existing lane information according to a matching result;

determining an actual lane where the vehicle is located based on the association relationship and the image lane where the vehicle is located.

Based on the technical feature, the embodiment of the present disclosure establishes an association relationship between the image lane and the actual lane according to a matching result of the image lane information and the actual lane information. Based on the association relationship, the actual lane where the vehicle is located is determined, so that the determination of the actual lane where the vehicle is located is realized.

Further, the method further comprises:
determining an image position of the vehicle based on a positional relationship between the image acquisition device of the lane line image and the vehicle and a calibration result of the image acquisition device; and
determining an image lane where the vehicle is located based on an image position of the vehicle and an image area of the image lane.

Based on this technical feature, the embodiment of the present disclosure determines the image position of the vehicle; and determines the image lane where the vehicle is located based on the image position of the vehicle and the image area of the image lane, thereby determining the image lane where the vehicle is located.

Further, after the determining the actual lane where the vehicle is located based on the image lane information and the actual lane information, the method further comprises:
correcting the actual lane information of the actual lane where the vehicle is located in the existing lane information by using the image lane information of the actual lane where the vehicle is located.

Based on this technical feature, the embodiment of the present disclosure corrects the actual lane information of the actual lane where the vehicle is located in the existing lane information by using the image lane information of the actual lane where the vehicle is located.

Further, the correcting the actual lane information of the actual lane where the vehicle is located in the existing lane information by using the image lane information of the actual lane where the vehicle is located includes:
determining a relative position relationship between the actual lane where the vehicle is located and the image acquisition device based on a calibration result of the image acquisition device of the lane map;
determining a new position of the actual lane where the vehicle is located based on the determined relative position relationship and the actual position of the image acquisition device; and
correcting the original position of the actual lane where the vehicle is located in the existing lane information by using the determined new position.

Based on this technical feature, the embodiment of the present disclosure determines the relative position relationship between the actual lane where the vehicle is located and the image acquisition device. Based on the determined relative position relationship and the actual position of the image acquisition device, a new position of the actual lane where the vehicle is located is determined, so that correction of lane position information in the existing lane information is realized.

Further, before the determining a new position of the actual lane where the vehicle is located based on the determined relative position relationship and the actual position of the image acquisition device, the method further includes:

if the image acquisition device is an in-vehicle image acquisition device, determining an actual position of the image acquisition device based on the position information of the vehicle.

Based on this technical feature, the embodiment of the present disclosure determines the actual position of the image acquisition device according to the position information of the vehicle if the image acquisition device is an in-vehicle image acquisition device, thereby determining the actual position of the image acquisition device for an application scene of the in-vehicle image acquisition device.

Further, the correcting actual lane information of the actual lane where the vehicle is located in the existing lane information by using the image lane information of the actual lane where the vehicle is located includes:
clustering the image lane information of the actual lane where the vehicle is located if the number of information pieces of the image lane information of the actual lane where the vehicle is located is greater than a set number threshold;
determining target lane information from the image lane information of the actual lane where the vehicle is located based on the clustering result; and
correcting actual lane information of an actual lane where the vehicle is located in the existing lane information by using the target lane information.

Based on this technical feature, the embodiments of the present disclosure cluster the image lane information of the actual lane where the vehicle is located. According to the clustering result, the target lane information is determined.

An embodiment of the present disclosure further provides an apparatus for determining a lane where a vehicle is located, the apparatus including:
an information determining module configured to determine image lane information of a position of the vehicle based on the lane line image;
an information acquisition module, configured to acquire actual lane information of the position where the vehicle is located from existing lane information according to the positioning information of the vehicle;
a lane determining module, configured to determine an actual lane where the vehicle is located based on the image lane information and the actual lane information.

Further, the information determining module includes:
an image recognition unit configured to recognize the lane line image;
an information determining unit configured to determine the image lane information based on the lane line information obtained through recognition.

Further, the information determining unit includes:
a lane type determining subunit configured to determine a lane type of an image lane formed by lane lines based on the obtained lane line information; and
a lane information determining subunit configured to use the determined lane type as the image lane information.

Further, the lane type determination subunit is specifically configured to:
determine at least one of a traveling direction, a traveling vehicle type, and a traveling position of the image lane based on the lane line information; and
determine a lane type of the image lane based on at least one of a traveling direction, a traveling vehicle type, and a traveling position of the image lane.

Further, the information acquisition module includes:
a road position determining unit configured to determine a road position where the vehicle is located based on a positioning longitude and latitude in the positioning information;

a traveling direction determining unit configured to determine a traveling direction of the vehicle according to a heading angle in the positioning information; and a lane information acquiring unit configured to acquire actual lane information of the position where the vehicle is located from existing lane information according to the road position where the vehicle is located and the traveling direction of the vehicle.

Further, the lane determination module includes:

an information matching unit configured to match the image lane information and the actual lane information;

a relationship establishing unit configured to establish an association relationship between an image lane associated with the lane line image and an actual lane associated with the existing lane information according to a matching result; and a lane determining unit configured to determine the actual lane where the vehicle is located based on the association relationship and the image lane where the vehicle is located.

Further, the apparatus further comprises:

a position determining module configured to determine an image position of the vehicle according to a position relationship between the image acquisition device of the lane line image and the vehicle and a calibration result of the image acquisition device before determining the actual lane where the vehicle is located based on the association relationship and the image lane where the vehicle is located; and a lane determining module, configured to determine the image lane where the vehicle is located based on an image position of the vehicle and an image area of the image lane.

Further, the apparatus further comprises:

an information correction module, configured to, after determining the actual lane where the vehicle is located according to the image lane information and the actual lane information, correct the actual lane information of the actual lane where the vehicle is located in the existing lane information by using the image lane information of the actual lane where the vehicle is located.

Further, the information correction module includes:

a position relationship determination unit configured to determine a relative position relationship between the actual lane where the vehicle is located and the image acquisition device based on the calibration result of the image acquisition device of the lane line image;

a new position determining unit configured to determine a new position of an actual lane where the vehicle is located based on the determined relative position relationship and the actual position of the image acquisition device; and a position correction unit configured to correct the original position of the actual lane where the vehicle is located in the existing lane information by using the determined new position.

Further, the apparatus further includes:

a position determining module configured to determine an actual position of the image acquisition device based on the position information of the vehicle if the image acquisition device is an in-vehicle image acquisition device before determining a new position of the actual lane where the vehicle is located based on the determined relative position relationship and the actual position of the image acquisition device.

Further, the information correction module includes:

a clustering unit configured to cluster the image lane information of the actual lane where the vehicle is located if a number of information pieces of the image lane information of the actual lane where the vehicle is located is greater than a set number threshold;

an information determining unit configured to determine target lane information from image lane information of an actual lane where the vehicle is located according to a clustering result; and an information correction unit configured to correct actual lane information of an actual lane where the vehicle is located in the existing lane information by using the target lane information.

An embodiment of the present disclosure further provides an electronic device including:

at least one processor; and a memory in communication with the at least one processor;

where the memory stores instructions executable by the at least one processor to enable the at least one processor to perform the method of any of embodiments of the disclosure.

An embodiment of the present disclosure further provides a non-transitory computer-readable storage medium storing computer instructions for causing the computer to perform the method described in any one of the embodiments of the present disclosure.

BRIEF DESCRIPTION OF THE DRAWINGS

The drawings are intended to provide a better understanding of the present disclosure and are not to be construed as limiting the disclosure, where.

DETAILED DESCRIPTION OF EMBODIMENTS

Example embodiments of the present disclosure are described below in connection with the accompanying drawings, in which various details of the embodiments of the present disclosure are included to facilitate understanding, and are to be considered as examples only. Accordingly, one of ordinary skill in the art will recognize that various changes and modifications may be made to the embodiments described herein without departing from the scope and spirit of the present disclosure. Also, for clarity and conciseness, descriptions of well-known functions and structures are omitted from the following description.

First Embodiment

Figure 1:
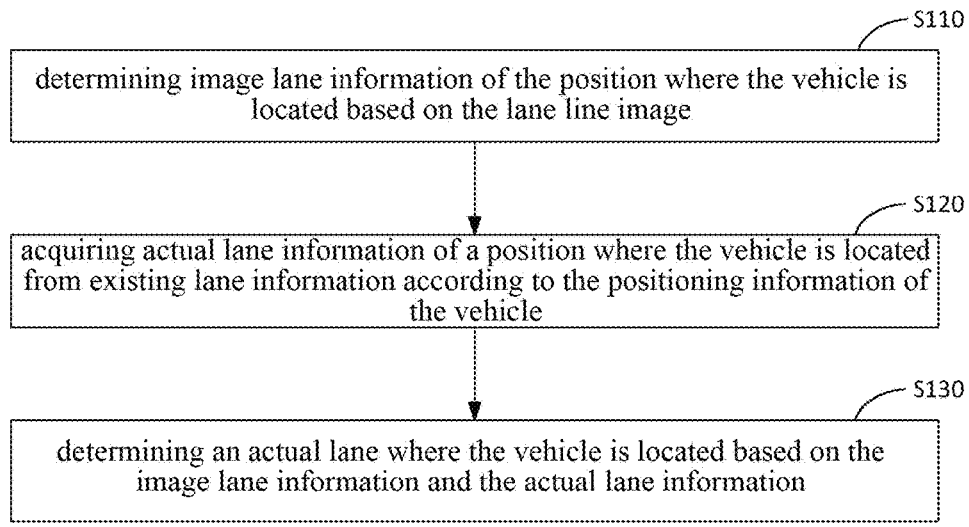
FIG. 1 is a flowchart of a method for determining a lane where a vehicle is located according to a first embodiment of the present disclosure.

FIG. 1 is a flowchart of a method for determining a lane where a vehicle is located according to a first embodiment of the present disclosure. The present embodiment is applicable to a case in which the actual lane where the vehicle is located is determined with a low cost. The method may be performed by apparatus for determining a lane where a vehicle is located. The apparatus may be implemented in software and/or hardware. Referring to FIG. 1, a method for determining a lane where a vehicle is located according to an embodiment of the present disclosure includes S110 to S130.

S110 includes determining image lane information of the position where the vehicle is located based on the lane line image.

The lane line image refers to an image of the lane line at the position where the vehicle is located acquired by the image acquisition device.

Since the lane line image generally includes only a part of lane lines at the position of the vehicle, the lane where the vehicle is located can not be directly determined from the lane line image.

The image acquisition device may be any device capable of acquiring an image, and in particular, the image acquisition device is a camera.

Alternatively, the image acquisition device may be disposed at a position on a roadside fixture or on a vehicle.

Typically, the image acquisition device may be mounted on the head or tail of the vehicle so that the acquired lane line image includes more lane lines.

The image lane information refers to lane information of a lane at a position where the vehicle is located, determined from a lane line image.

Specifically, the lane information may be any information of a lane, such as a width of the lane, a number of lanes, a distribution of lanes, an in-lane guide arrow, a color of a lane line associated with the lane, a lane line of the lane being dotted line or solid line, or the like.

Specifically, the determining image lane information of the position where the vehicle is located based on the lane line image includes:

performing lane detection according to the lane line image; and determining lane information based on the detected lane.

The lane detection logic may be any target detection logic in the existing technology, which is not limited in embodiments.

S120 includes acquiring actual lane information of a position where the vehicle is located from existing lane information according to the positioning information of the vehicle.

Here, the existing lane information refers to lane information that already exists.

The information includes a lane sign for identifying the actual lane where the vehicle is located so that the user or downstream logic knows the lane where the vehicle is located.

Typically, in the case where currently the general map is widely popularized, the existing lane information can be acquired from the general map.

Alternatively, if the high-precision map is widely popularized in the future, the existing lane information may be acquired from the high-precision map in order to acquire more accurate lane information.

The embodiment of the disclosure does not limit the source of the existing lane information.

Since the existing lane information is the lane information that already exists, the cost of obtaining the actual lane information from the existing lane information is low.

The actual lane information refers to lane information of a lane at a position where the vehicle is located, obtained from existing lane information.

Specifically, the positioning information of the vehicle may include only the positioning longitude and latitude, or may include the positioning longitude and latitude and also the heading angle.

If the positioning information includes only the positioning longitude and latitude, the acquiring actual lane information of a position where the vehicle is located from existing lane information according to the positioning information of the vehicle, includes:

matching a position of the vehicle with an index position in existing lane information; and using lane information associated with a index location matching the position of the vehicle as actual lane information of the position where the vehicle is located.

In order to improve the accuracy of the actual lane information, if the positioning information includes the positioning longitude and latitude, and also includes the heading angle, the acquiring the actual lane information of the position where the vehicle is located from the existing lane information according to the positioning information of the vehicle includes:

determining a road position where the vehicle is located according to a positioning longitude and latitude in the positioning information;

determining a traveling direction of the vehicle according to a heading angle in the positioning information; and acquiring actual lane information of the position where the vehicle is located from existing lane information according to the road position where the vehicle is located and the traveling direction of the vehicle.

Based on this technical feature, the implementation of the present disclosure can acquire the actual lane information of the vehicle in the driving direction of the vehicle from the existing lane information, to improve the accuracy of the actual lane information.

S130 includes determining an actual lane where the vehicle is located based on the image lane information and the actual lane information.

The actual lane refers to a lane in existing lane information.

Specifically, the determining an actual lane where the vehicle is located based on the image lane information and the actual lane information includes:

matching the image lane information with the actual lane information;

establishing an association relationship between an image lane associated with the lane line image and an actual lane associated with the existing lane information according to a matching result; and determining an actual lane where the vehicle is located based on the association relationship and the image lane where the vehicle is located.

Herein, the image lane refers to a lane in a lane line image.

For implementing the determination of the image lane where the vehicle is located, before the determining an actual lane where the vehicle is located based on the association relationship and the image lane where the vehicle is located, the method further comprises:

determining an image position of the vehicle based on a positional relationship between the image acquisition device of the lane line image and the vehicle and a calibration result of the image acquisition device; and determining an image lane where the vehicle is located based on an image position of the vehicle and an image area of the image lane.

The image position of the vehicle refers to the position of the vehicle in the lane line image.

Specifically, the positional relationship between the image acquisition device of the lane line image and the vehicle may be predetermined, or may be determined based on the positions of the image acquisition device of the lane line image and the vehicle.

The image area of the image lane can be recognized from the lane line image.

The application scenarios of the embodiments of the present disclosure may be described as follows.

Figure 2:
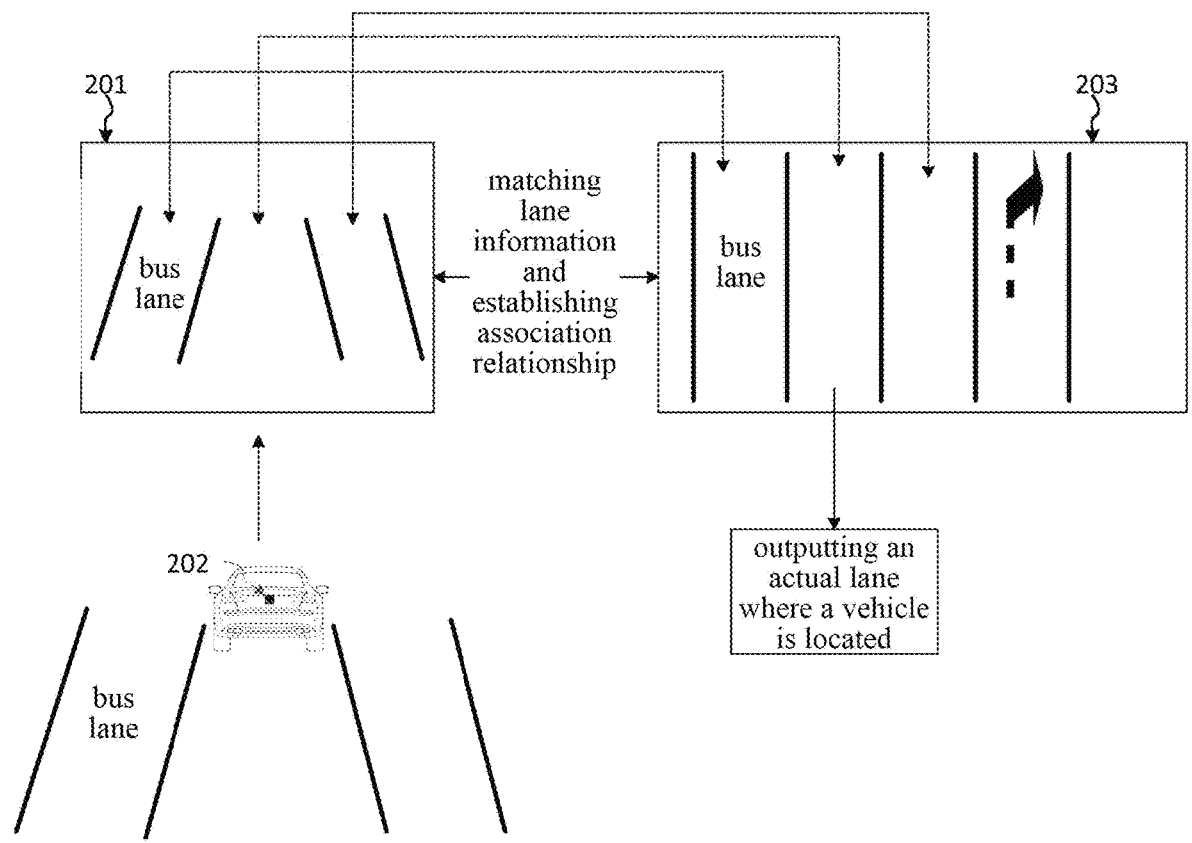
FIG. 2 is a schematic diagram of an application scenario according to a first embodiment of the present disclosure.
Figure 3:
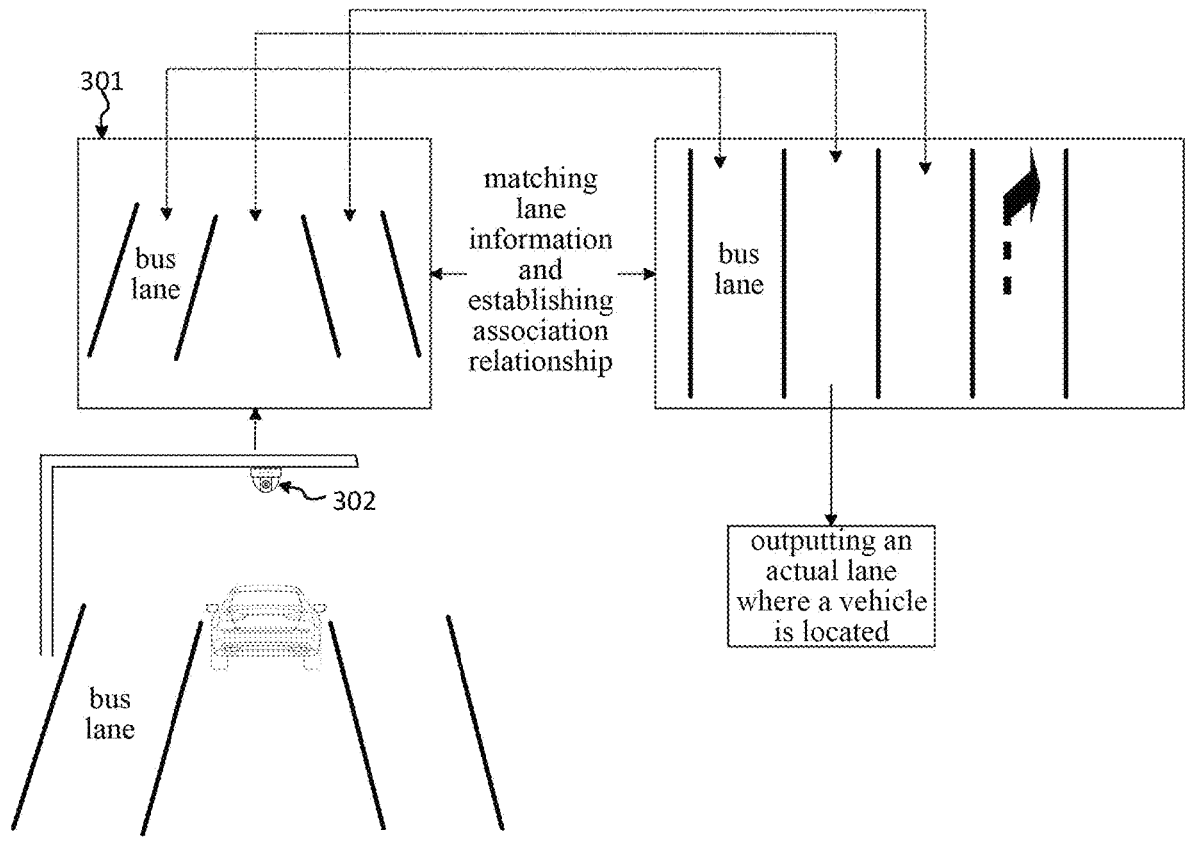
FIG. 3 is a schematic diagram of another application scenario according to a first embodiment of the present disclosure.

A typical application scenario is that referring to FIG. 2, an image acquisition device 202 of the lane line image 201 is disposed on a vehicle. By matching the image lane in the lane line image 201 with the actual lane in the existing information 203 based on the lane information, an association between the image lane and the actual lane is established. The actual lane where the vehicle is located is determined based on the established association and the image lane where the vehicle is located. The scenario has the advantage that the real-time determination of the lane where the vehicle is located can be realized based on the lane line image acquired in real time.

An alternative application scenario is that referring to FIG. 2 the image acquisition device 302 of the lane line image 301 is arranged on a fixture by the road. The matching logic of the scenario is the same as that of the above-mentioned application scene. The advantage of the scenario is that since the image acquisition device in the present application scenario is usually arranged in a road section where a violation may occur, the lane where the vehicle is located determined in the scenario has a key guiding effect on user navigation. Moreover, the road on which the vehicle is located does not need to be determined in real time, thereby reducing the calculation amount.

The embodiments of the present disclosure determine the actual lane where the vehicle is located based on the image lane information and the actual lane information. Since the image lane information can be determined from the lane line image, and the actual lane information can be acquired from the existing lane information, the embodiment of the present disclosure does not need the laying of the sensor and the determination of the high-precision map in an unapplied range. Therefore, the embodiments of the present disclosure can reduce the cost of determining the lane where the vehicle is located, thereby improving the application range.

Second Embodiment

Figure 4:
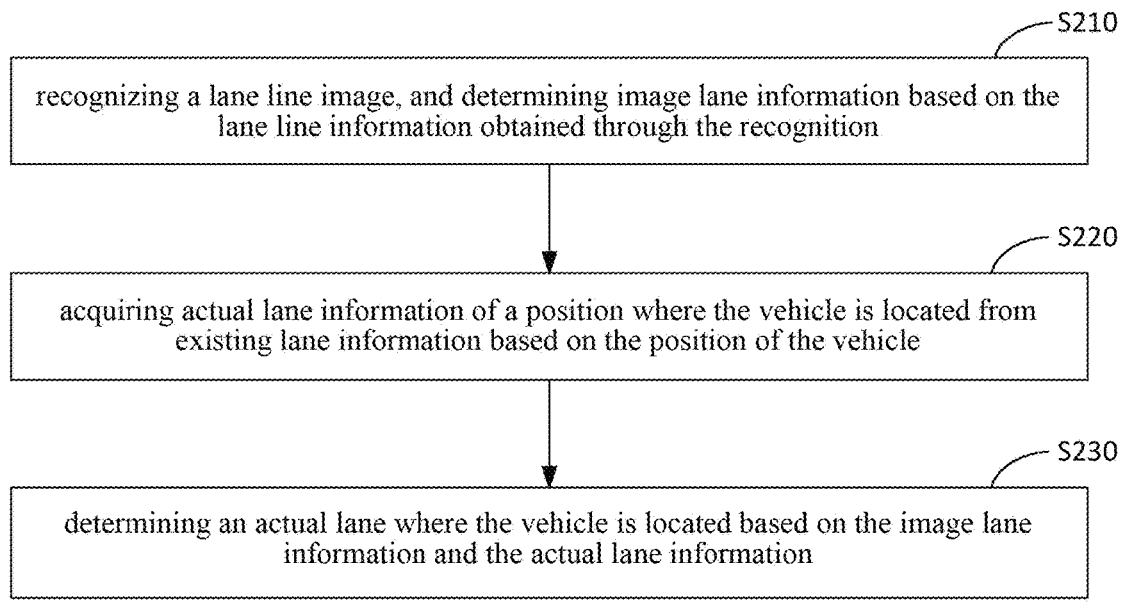
FIG. 4 is a flowchart of a method for determining a lane where a vehicle is located according to a second embodiment of the present disclosure.

FIG. 4 is a flowchart of a method for determining a lane where a vehicle is located according to a second embodiment of the present disclosure. This embodiment is a development scheme for S110 based on the above-mentioned embodiment. Referring to FIG. 4, an embodiment of the present disclosure provides a method for determining a lane where a vehicle is located, including S210 to S230.

S210 includes recognizing a lane line image, and determining image lane information based on the lane line information obtained through the recognition.

Alternatively, the method for recognizing the lane line image may be any image recognition method.

Specifically, the lane line information includes at least one of: a lane line width, a lane line color, a lane line being a dotted line or a solid line, and an in-lane guide arrow.

Specifically, the determining image lane information based on the obtained lane line information includes:

determining at least one of a traveling direction, a traveling vehicle type, and a traveling position of the image lane based on the lane line information; and using at least one of the traveling direction, the traveling vehicle type, and the traveling position of the image lane as the image lane information.

Typically, the determining the image lane information based on the obtained lane information includes:

determining, based on the obtained lane line information, a lane type of the image lane formed by the lane lines; and using the determined lane type as the image lane information.

Based on this technical feature, the embodiment of the present disclosure determines a lane type and uses the determined lane type as image lane information. The lane type can more accurately recognize the lane than other information of the lane, and occupy smaller amount of data. Therefore, compared with determining the actual lane where the vehicle is located by using other information of the lane, the embodiment of the present disclosure can improve the accuracy of determining the lane and reduce the amount of calculated data.

To improve accuracy of an actual lane where the vehicle is located, the determining, based on the lane line information, a lane type of the image lane formed by the lane line includes:

determining at least one of a traveling direction, a traveling vehicle type, and a traveling position of the image lane based on the lane line information;

determining a lane type of the image lane based on at least one of the traveling direction, the traveling vehicle type, and the traveling position of the image lane.

Specifically, the lane type includes at least one of a left-most lane, a right-most lane, a bus lane, and a target traveling direction lane.

Determining a lane type of the image lane according to a traveling position includes:

if the traveling position is the left most lane of the road, determining that the lane type is the left lane; and if the traveling position is the rightmost side of the road, determining that the lane type is the right lane.

Determining a lane type of the image lane according to a traveling direction includes:

if the driving direction is a left driving direction, determining that the lane type is a left turning lane;

if the traveling direction is a right direction, determining that the lane type is a right turn lane; and if the traveling direction is straight, determining that the lane type is straight lane.

Determining a lane type of the image lane based on a traveling vehicle type includes:

if the type of the traveling vehicle is bus-specific, determining that the type of the lane is a bus lane.

S220 includes acquiring actual lane information of a position where the vehicle is located from existing lane information based on the position of the vehicle.

S230 includes determining an actual lane where the vehicle is located based on the image lane information and the actual lane information.

The embodiment of the present disclosure determines the image lane information according to the obtained lane line information. Because lane line information has an inherent association with lane information, compared with detecting the lane information directly from the lane line image, the embodiment of the present disclosure can realize further mining of the lane information through the lane line information, thereby realizing accurate determination of the lane where the vehicle is located based on the mined lane information.

Third Embodiment

Figure 5:
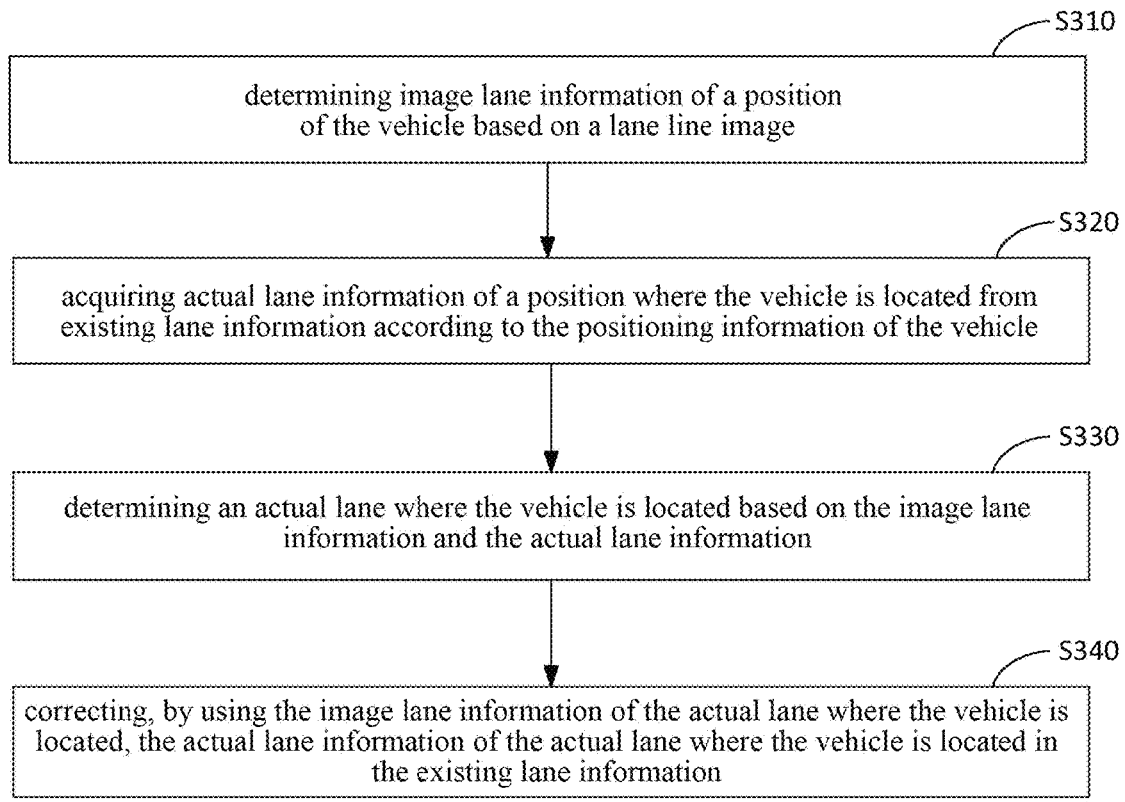
FIG. 5 is a flowchart of a method for determining a lane where a vehicle is located according to a third embodiment of the present disclosure.

FIG. 5 is a flowchart of a method for determining a lane where a vehicle is located according to a third embodiment of the present disclosure. This embodiment is an alternative based on above embodiments. Referring to FIG. 5, an embodiment of the present disclosure provides a method for determining a lane where a vehicle is located, including S310 to S340.

S310 includes determining image lane information of a position of the vehicle based on a lane line image.

S320 includes acquiring actual lane information of a position where the vehicle is located from existing lane information according to the positioning information of the vehicle.

S330 includes determining an actual lane where the vehicle is located based on the image lane information and the actual lane information.

S340 includes correcting, by using the image lane information of the actual lane where the vehicle is located, the actual lane information of the actual lane where the vehicle is located in the existing lane information.

Specifically correcting existing lane information using lane information recognized from the lane line image, including:

correcting the existing lane information with information other than the lane position recognized from the lane line image.

In order to correct the lane position in the existing lane information, the correcting the actual lane information of the actual lane where the vehicle is located in the existing lane information by using the image lane information of the actual lane where the vehicle is located includes:

determining a relative position relationship between an actual lane where the vehicle is located and the image acquisition device based on a calibration result of the image acquisition device of the lane image;

determining a new position of the actual lane where the vehicle is located based on the determined relative position relationship and an actual position of the image acquisition device; and correcting the original position of the actual lane where the vehicle is located in the existing lane information by using the determined new position.

Before determining a new position of an actual lane where the vehicle is located based on the determined relative position relationship and the actual position of the image acquisition device, to achieve determination of the actual position of the image acquisition device, the method further includes:

if the image acquisition device is an in-vehicle image acquisition device, determining an actual position of the image acquisition device based on the position information of the vehicle.

To improve the correction accuracy of the existing lane information, the correcting the actual lane information of the actual lane where the vehicle is located in the existing lane information by using the image lane information of the actual lane where the vehicle is located includes:

clustering the image lane information of the actual lane where the vehicle is located if a number of information pieces of the image lane information of the actual lane where the vehicle is located is greater than a set number threshold;

determining target lane information from the image lane information of the actual lane where the vehicle is located based on a clustering result; and correcting actual lane information of an actual lane where the vehicle is located in the existing lane information by using the target lane information.

The set number threshold value is greater than 2, and the value of the specifically set number threshold value may be determined according to actual requirements.

Specifically, the determining the target lane information from the image lane information of the actual lane where the vehicle is located based on a clustering result includes:

performing statistics on the image lane information of the clusters obtained by clustering;

using the cluster with the largest amount of the image lane information as the target cluster; and determining target lane information based on the image lane information in the target cluster.

Optionally, determining target lane information based on the image lane information in the target cluster includes:

calculating an average value of target lane information in the target cluster;

using the calculated average value as target lane information; or, using the image lane information located at the center of the target cluster as the target lane information.

Fourth Embodiment

Figure 6:
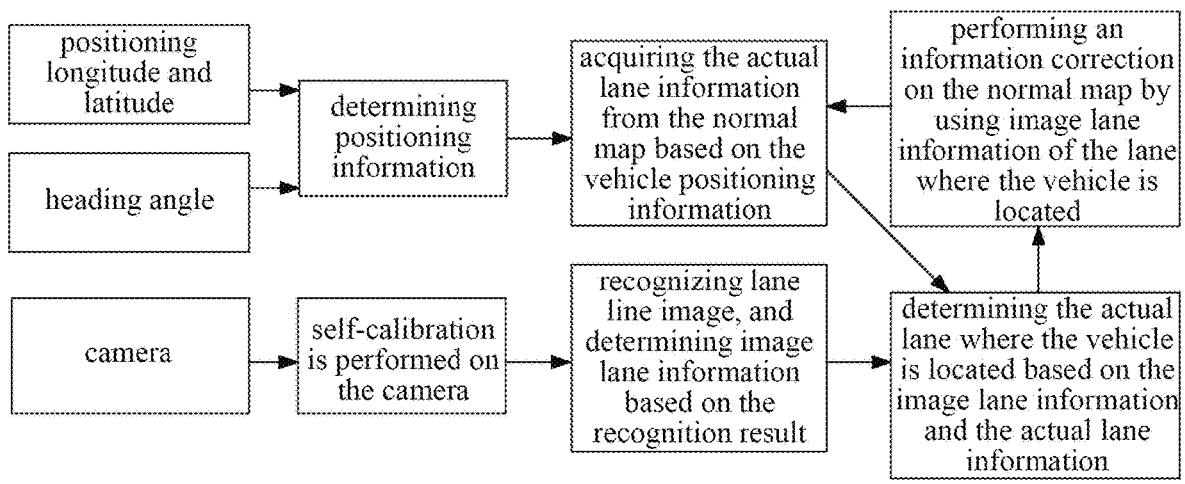
FIG. 6 is a flowchart of a method for determining a lane where a vehicle is located according to a fourth embodiment of the present disclosure.

FIG. 6 is a flowchart of a method for determining a lane where a vehicle is located according to a fourth embodiment of the present disclosure. This embodiment is based on the above-described embodiments, and an alternative solution is proposed in which an image acquisition device is an in-vehicle rear-view camera, and existing lane information is acquired from a normal map. Referring to FIG. 6, an embodiment of the present disclosure provides a method for determining a lane where a vehicle is located, including:

collecting a road lane line based on a rear-view camera;

recognizing a lane line image to obtain attribute information of the lane line;

determining a lane type according to the attribute information of the lane line;

associating a lane in a lane line image with a lane in a location of a vehicle in a normal map according to the lane type, where the lane in the location of the vehicle in the normal map can be acquired according to a positioning longitude and latitude of the vehicle and a traveling direction; and determining the lane where the vehicle is located according to the association relationship.

Specifically, the associating a lane in a lane line image with a lane in a location of a vehicle in a normal map according to a lane type, includes:

according to at least one of a left lane, a right lane, a bus lane, and a target travel direction lane, associating a lane in a lane line image with a lane of a road position where a vehicle is located in a normal map.

If the association fails, the following steps are performed:

determining a relative position relationship between a lane in a lane line image and a camera according to a calibration result of the camera;

determining a lane position according to the relative position relationship and a position of the camera, the position of the camera being determined according to position information of a vehicle;

storing a determined lane position and other information of the lane, the other information being information other than the lane position; and clustering at least two lane positions of the stored target position in response to the information correction request for the lane of the target position, and according to the clustering result, correcting the position and other information for the lane of the target position.

The solution can achieve the following effects:

multiple kinds of lane information are fused, and lane positioning is performed in combination with navigation information, which is low in cost and can be applied in most driving scenarios;

the existing lane information can be corrected by using the lane recognition result; and the camera self-calibration result and the fusion positioning result are used, such that high-precision lane information can be obtained.

Fifth Embodiment

Figure 7:
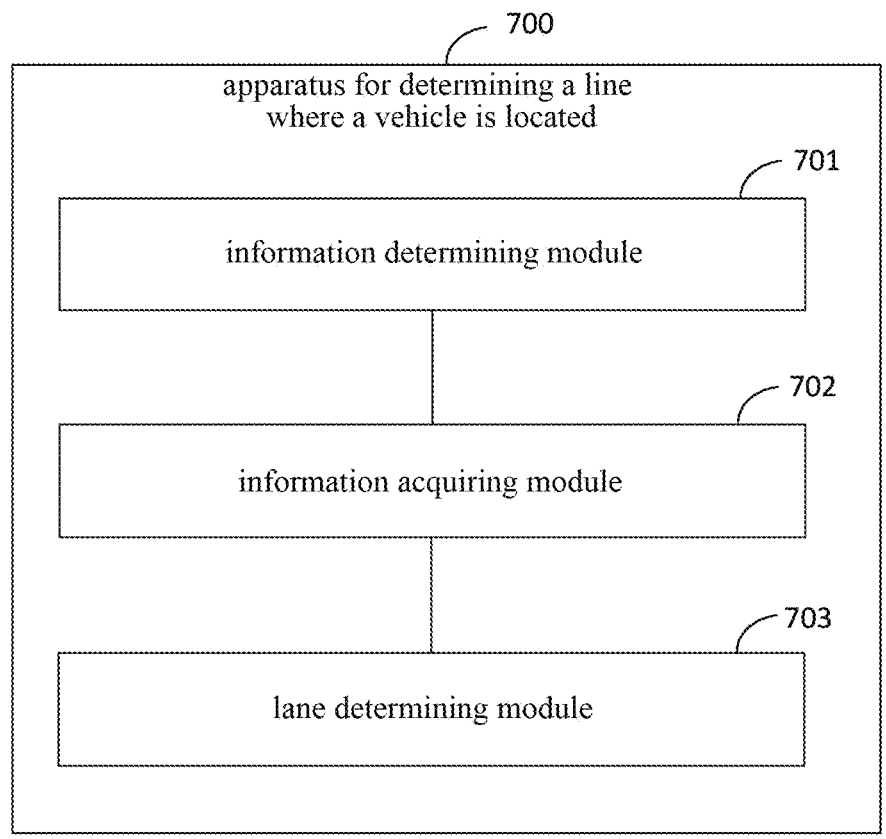
FIG. 7 is a schematic structural diagram of an apparatus for determining a lane where a vehicle is located according to a fifth embodiment of the present disclosure.

FIG. 7 is a schematic structural diagram of an apparatus for determining a line where a vehicle is located according to a fifth embodiment of the present disclosure. Referring to FIG. 7, an embodiment of the present disclosure further provides an apparatus 700 for determining a line where a vehicle is located, which includes an information determination module 701, an information acquisition module 702, and a lane determination module 703.

The information determining module 701 is configured to determine image lane information of a position where the vehicle is located based on the lane line image.

The information acquiring module 702, configured to acquire actual lane information of the position where the vehicle is located from existing lane information according to the positioning information of the vehicle.

The lane determining module 703, configured to determine an actual lane where the vehicle is located based on the image lane information and the actual lane information.

The embodiments of the present disclosure determine the actual lane where the vehicle is located based on the image lane information and the actual lane information. Since the image lane information can be determined from the lane line image, and the actual lane information can be acquired from the existing lane information, the embodiment of the present disclosure does not require the laying of the sensor and the determination of the high-precision map in the unapplied range. Therefore, the embodiments of the present disclosure can reduce the cost of determining the lane where the vehicle is located, thereby improving the application range.

Further, the information determining module includes:

an image recognition unit configured for recognizing the lane line image; and an information determining unit configured to determine the image lane information based on the lane line information obtained through the recognition.

Further, the information determining unit includes:

a lane type determining subunit configured to determine a lane type of an image lane formed by lane lines based on the obtained lane line information; and a lane information determining subunit configured to use the determined lane type as the image lane information.

Further, the lane type determination subunit is specifically configured to:

determine at least one of a traveling direction, a traveling vehicle type, and a traveling position of the image lane based on the lane line information;

determine a lane type of the image lane based on at least one of the traveling direction, the traveling vehicle type, and the traveling position of the image lane.

Further, the information acquisition module includes:

a road position determining unit configured to determine a road position where the vehicle is located based on a positioning longitude and latitude in the positioning information;

a traveling direction determining unit configured to determine a traveling direction of the vehicle according to a heading angle in the positioning information;

a lane information acquiring unit configured to acquire actual lane information of a position where the vehicle is located from existing lane information according to the road position where the vehicle is located and the traveling direction of the vehicle.

Further, the lane determination module includes:

an information matching unit configured to match the image lane information and the actual lane information;

a relationship establishing unit configured to establish an association relationship between an image lane associated with the lane line image and an actual lane associated with the existing lane information according to a matching result; and a lane determining unit configured to determine an actual lane where the vehicle is located based on the association relationship and the image lane where the vehicle is located.

Further, the apparatus further comprises:

a position determining module configured to determine an image position of the vehicle according to a position relationship between the image acquisition device of the lane line image and the vehicle and a calibration result of the image acquisition device, before determining an actual lane where the vehicle is located according to the association relationship and the image lane where the vehicle is located; and a lane determining module, configured to determine an image lane where the vehicle is located based on an image position of the vehicle and an image area of the image lane.

Further, the apparatus further comprises:

an information correction module, configured to, after determining the actual lane where the vehicle is located according to the image lane information and the actual lane information, correct the actual lane information of the actual lane where the vehicle is located in the existing lane information by using the image lane information of the actual lane where the vehicle is located.

Further, the information correction module includes:

a position relationship determination unit configured to determine a relative position relationship between an actual lane where the vehicle is located and the image acquisition device based on a calibration result of the image acquisition device of the lane line image;

a new position determining unit configured to determine a new position of an actual lane where the vehicle is located based on the determined relative position relationship and the actual position of the image acquisition device; and a position correction unit configured to correct the original position of the actual lane of the vehicle in the existing lane information by using the determined new position.

Further, the apparatus further comprises:

a position determining module configured to determine an actual position of the image acquisition device according to the position information of the vehicle if the image acquisition device is an in-vehicle image acquisition device before determining a new position of the actual lane where the vehicle is located based on the determined relative position relationship and the actual position of the image acquisition device.

Further, the information correction module includes:

a clustering unit configured to cluster the image lane information of the actual lane where the vehicle is located if a number of information pieces of the image lane information of the actual lane where the vehicle is located is greater than a set number threshold;

an information determining unit configured to determine target lane information from image lane information of an actual lane where the vehicle is located according to a clustering result; and an information correction unit configured to correct actual lane information of an actual lane where the vehicle is located in the existing lane information by using the target lane information.

Sixth Embodiment

According to an embodiment of the present disclosure, the present disclosure also provides an electronic device and a readable storage medium.

Figure 8:
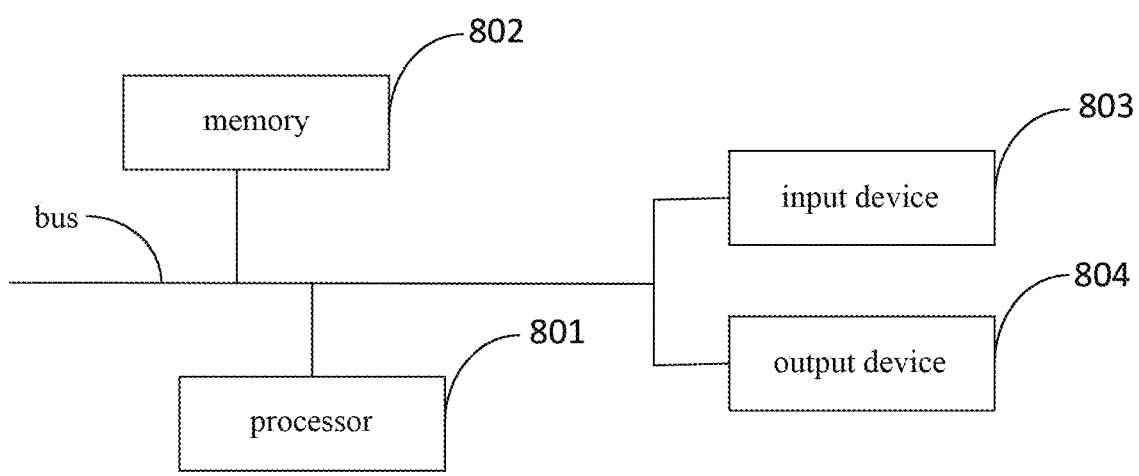
FIG. 8 is a block diagram of an electronic device for implementing a method for determining a lane where a vehicle is located according to an embodiment of the present disclosure is located.

As shown in FIG. 8, FIG. 8 is a block diagram of an electronic device of a method for determining a lane where a vehicle is located according to an embodiment of the present disclosure. The electronic device is intended to represent various forms of digital computers, such as laptop computers, desktop computers, worktables, personal digital assistants, servers, blade servers, mainframe computers, and other suitable computers. The electronic device may also represent various forms of mobile devices, such as personal digital processing, cellular telephones, smart phones, wearable devices, and other similar computing devices. The components shown herein, their connections and relationships, and their functions are by way of example only and are not intended to limit the implementation of the present disclosure as described and/or claimed herein.

As shown in FIG. 8, the electronic device includes one or more processors 801, a memory 802, and an interface for connecting components, including a high speed interface and a low speed interface. The various components are interconnected by different buses and may be mounted on a common motherboard or otherwise as desired. The processor may process instructions executed within the electronic device, including instructions stored in or on a memory to display graphical information of the GUI on an external input/output device, such as a display device coupled to an interface. In other embodiments, multiple processors and/or multiple buses may be used with multiple memories and multiple memories, if desired. Similarly, multiple electronic devices may be connected, each electronic device providing a portion of the necessary operations (e.g., as a server array, a set of blade servers, or a multiprocessor system). In FIG. 8, a processor 801 is used as an example.

The memory 802 is a non-transitory computer readable storage medium provided in this application. The memory stores instructions executable by at least one processor to cause the at least one processor to perform the method for determining a lane where a vehicle is located as provided in the present disclosure. The non-transitory computer-readable storage medium of the present disclosure stores computer instructions for causing a computer to perform the method for determining a lane where a vehicle is located as provided in the present disclosure.

The memory 802, as a non-transitory computer-readable storage medium, may be used to store a non-transitory software program, a non-transitory computer-executable program, and a module, such as a program instruction/module (for example, the information determining module 701, the information obtaining module 702, and the lane determining module 703 shown in FIG. 7) corresponding to a method for determining a lane where a vehicle is located in an embodiment of the present disclosure. The processor 801 executes various functional applications and data processing of the server by running non-transitory software programs, instructions, and modules stored in the memory 802, that is, implements the method for determining the lane where the vehicle is located in the method embodiment described above.

The memory 802 may include a storage program area and a storage data area, where the storage program area may store an operating system, an application program required by at least one function. The storage data area may store data or the like created according to the use of the electronic device for determining the lane where the vehicle is located. In addition, memory 802 may include high speed random access memory, and may also include non-transitory memory, such as at least one magnetic disk storage device, flash memory device, or other non-transitory solid state storage device. In some embodiments, memory 802 may optionally include remotely disposed memory relative to processor 801, which may be connected via a network to the electronic device for determining the lane where the vehicle is located. Examples of such networks include, but are not limited to, the Internet, enterprise intranets, block chain networks, local area networks, mobile communication networks, and combinations thereof.

The electronic device performing the method for determining the vehicle lane may further include an input device 803 and an output device 804. The processor 801, the memory 802, the input device 803, and the output device 804 may be connected via a bus or otherwise, as illustrated in FIG. 8.

The input device 803 may receive input number or character information, and generate key signal input related to user settings and functional control of the electronic device for determining the lane where the vehicle is located, such as a touch screen, a keypad, a mouse, a track pad, a touch pad, a pointer bar, one or more mouse buttons, a trackball, a joystick, or the like. The output device 804 may include a display device, an auxiliary lighting device (e.g., an LED), a tactile feedback device (e.g., a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input device, and at least one output device, and transmit the data and instructions to the storage system, the at least one input device, and the at least one output device.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

To provide interaction with a user, the systems and techniques described herein may be implemented on a computer having a display device (e.g., a CRT (cathode ray tube) or LCD (liquid crystal display) monitor) for displaying information to the user; and a keyboard and a pointing device (e.g., a mouse or a trackball) through which a user can provide input to a computer. Other types of devices may also be used to provide interaction with a user; for example, the feedback provided to the user may be any form of sensory feedback (e.g., visual feedback, auditory feedback, or tactile feedback); and any form (including acoustic input, voice input, or tactile input) may be used to receive input from the user.

The systems and techniques described herein may be implemented in a computing system including a backend component (e.g., as a data server), or a computing system including a middleware component (e.g., an application server), or a computing system including a front-end component (e.g., a user computer having a graphical user interface or a web browser through which a user may interact with embodiments of the systems and techniques described herein), or a computing system including any combination of such backend component, middleware component, or front-end component. The components of the system may be interconnected by any form or medium of digital data communication (e.g., a communication network). Examples of communication networks include local area networks (LANs), wide area networks (WANs), the Internet, and block chain networks.

The computer system may include a client and a server. The client and server are typically remote from each other and typically interact through a communication network. The relationship between the client and the server is generated by a computer program running on the corresponding computer and having a client-server relationship with each other.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for determining a lane where a vehicle is located, comprising:
    determining image lane information of a position where the vehicle is located based on a lane line image, wherein the image lane information refers to lane information of the lane at a position where the vehicle is located, determined from a lane line image, and the lane line image is acquired by an image acquisition device;
    acquiring actual lane information where the vehicle is located from existing lane information according to positioning information of the vehicle, wherein the existing lane information refers to lane information that already exists, the existing lane information being acquired from a map, and the actual lane information refers to lane information of the lane at the position where the vehicle is located, obtained from the existing lane information;
    determining an actual lane where the vehicle is located based on the image lane information and the actual lane information; and
    correcting the actual lane information of the actual lane where the vehicle is located in the existing lane information by using the image lane information of the actual lane where the vehicle is located, said correcting including:
        clustering the image lane information of the actual lane where the vehicle is located in response to determining that a number of information pieces of the image lane information of the actual lane where the vehicle is located is greater than a set number threshold;
        determining target lane information from the image lane information of the actual lane where the vehicle is located based on the clustered lane information; and
        correcting actual lane information of an actual lane where the vehicle is located in the existing lane information by using the target lane information.

2. The method according to claim 1, wherein the determining image lane information of the position where the vehicle is located based on the lane line image comprises:
    recognizing lane line information in the lane line image; and
    determining the image lane information based on lane line information obtained through recognition.

3. The method according to claim 2, wherein the determining the image lane information based on the lane line information obtained through recognition comprises:
    determining, based on the obtained lane line information, a lane type of an image lane formed by lane lines; and
    using the determined lane type as the image lane information.

4. The method according to claim 3, wherein the determining, based on the obtained lane line information, a lane type of an image lane formed by lane lines comprises:
    determining at least one of a traveling direction, or a traveling position of the image lane based on the lane line information; and
    determining a lane type of the image lane based on at least one of the traveling direction, or the traveling position of the image lane.

5. The method according to claim 1, wherein the acquiring actual lane information of the position where the vehicle is located from existing lane information according to positioning information of the vehicle comprises:
  determining a road position where the vehicle is located according to a positioning longitude and latitude in the positioning information;
  determining a traveling direction of the vehicle according to a heading angle in the positioning information; and
  acquiring the actual lane information of the position where the vehicle is located from the existing lane information according to the road position where the vehicle is located and the traveling direction of the vehicle.

6. The method according to claim 1, wherein the determining an actual lane where the vehicle is located based on the image lane information and the actual lane information comprises:
  matching the image lane information with the actual lane information;
  establishing an association relationship between an image lane associated with the lane line image and an actual lane associated with the existing lane information according to a matching result; and
  determining the actual lane where the vehicle is located based on the association relationship and the image lane where the vehicle is located.

7. The method according to claim 6, wherein before determining the actual lane where the vehicle is located based on the association relationship and the image lane where the vehicle is located, the method further comprises:
  determining an image position of the vehicle based on a positional relationship between the image acquisition device of the lane line image and the vehicle, and a calibration result of the image acquisition device; and
  determining the image lane where the vehicle is located based on the image position of the vehicle and an image area of the image lane.

8. The method according to claim 1, wherein the correcting the actual lane information of the actual lane where the vehicle is located in the existing lane information by using the image lane information of the actual lane where the vehicle is located comprises:
  determining a relative position relationship between the actual lane where the vehicle is located and the image acquisition device based on a calibration result of the image acquisition device of the lane line image;
  determining a new position of the actual lane where the vehicle is located based on the determined relative position relationship and the actual position of the image acquisition device; and
  correcting the original position of the actual lane where the vehicle is located in the existing lane information by using the determined new position.

9. The method according to claim 8, wherein before determining a new position of the actual lane where the vehicle is located based on the determined relative position relationship and the actual position of the image acquisition device, the method further comprises:
  in response to determining that the image acquisition device is an in-vehicle image acquisition device, determining an actual position of the image acquisition device based on the position information of the vehicle.

10. An electronic device comprising:
  at least one processor; and
  a memory in communication with the at least one processor;
  wherein, the memory stores instructions executable by the at least one processor to enable the at least one processor to perform operations, the operations comprising:
  determining image lane information of a position where a vehicle is located based on a lane line image, wherein the image lane information refers to lane information of the lane at a position where the vehicle is located, determined from a lane line image, and the lane line image is acquired by an image acquisition device;
  acquiring actual lane information of the position where the vehicle is located from existing lane information according to positioning information of the vehicle, wherein the existing lane information refers to lane information that already exists, the existing lane information being acquired from a map, and the actual lane information refers to lane information of the lane at the position where the vehicle is located, obtained from the existing lane information;
  determining an actual lane where the vehicle is located based on the image lane information and the actual lane information;
  correcting the actual lane information of the actual lane where the vehicle is located in the existing lane information by using the image lane information of the actual lane where the vehicle is located, said correcting including:
    clustering the image lane information of the actual lane where the vehicle is located in response to determining that a number of information pieces of the image lane information of the actual lane where the vehicle is located is greater than a set number threshold;
    determining target lane information from the image lane information of the actual lane where the vehicle is located based on the clustered lane information; and
    correcting actual lane information of an actual lane where the vehicle is located in the existing lane information by using the target lane information.

11. The electronic device according to claim 10, wherein the determining image lane information of the position where the vehicle is located based on the lane line image comprises:
  recognizing lane line information in the lane line image; and
  determining the image lane information based on lane line information obtained through recognition.

12. The electronic device according to claim 11, wherein the determining the image lane information based on the lane line information obtained through recognition comprises:
  determining, based on the obtained lane line information, a lane type of an image lane formed by lane lines; and
  using the determined lane type as the image lane information.

13. The electronic device according to claim 12, wherein the determining, based on the obtained lane line information, a lane type of an image lane formed by lane lines comprises:
  determining at least one of a traveling direction, or a traveling position of the image lane based on the lane line information; and
  determining a lane type of the image lane based on at least one of the traveling direction, or the traveling position of the image lane.

14. The electronic device according to claim 10, wherein the acquiring actual lane information of the position where the vehicle is located from existing lane information according to positioning information of the vehicle comprises:
- determining a road position where the vehicle is located according to a positioning longitude and latitude in the positioning information;
- determining a traveling direction of the vehicle according to a heading angle in the positioning information; and
- acquiring the actual lane information of the position where the vehicle is located from the existing lane information according to the road position where the vehicle is located and the traveling direction of the vehicle.

15. The electronic device according to claim 10, wherein the determining an actual lane where the vehicle is located based on the image lane information and the actual lane information comprises:
- matching the image lane information with the actual lane information;
- establishing an association relationship between an image lane associated with the lane line image and an actual lane associated with the existing lane information according to a matching result; and
- determining the actual lane where the vehicle is located based on the association relationship and the image lane where the vehicle is located.

16. The electronic device according to claim 15, wherein before determining the actual lane where the vehicle is located based on the association relationship and the image lane where the vehicle is located, the operations further comprise:
- determining an image position of the vehicle based on a positional relationship between the image acquisition device of the lane line image and the vehicle, and a calibration result of the image acquisition device; and
- determining the image lane where the vehicle is located based on the image position of the vehicle and an image area of the image lane.

17. A non-transitory computer-readable storage medium storing computer instructions for causing the computer to perform operations, the operations comprising:
- determining image lane information of a position where a vehicle is located based on a lane line image, wherein the image lane information refers to lane information of the lane at a position where the vehicle is located, determined from a lane line image, and the lane line image is acquired by an image acquisition device;
- acquiring actual lane information of the position where the vehicle is located from existing lane information according to positioning information of the vehicle, wherein the existing lane information refers to lane information that already exists, the existing lane information being acquired from a map, and the actual lane information refers to lane information of the lane at the position where the vehicle is located, obtained from the existing lane information;
- determining an actual lane where the vehicle is located based on the image lane information and the actual lane information; and
- correcting the actual lane information of the actual lane where the vehicle is located in the existing lane information by using the image lane information of the actual lane where the vehicle is located, said correcting including:
- clustering the image lane information of the actual lane where the vehicle is located in response to determining that a number of information pieces of the image lane information of the actual lane where the vehicle is located is greater than a set number threshold;
- determining target lane information from the image lane information of the actual lane where the vehicle is located based on the clustered lane information; and
- correcting actual lane information of an actual lane where the vehicle is located in the existing lane information by using the target lane information.

\* \* \* \* \*